United States Patent
Maruyama

[11] Patent Number: 6,087,791
[45] Date of Patent: Jul. 11, 2000

[54] CONTROL APPARATUS FOR INTERNAL COMBUSTION TYPE ELECTRIC LOCOMOTIVE

[75] Inventor: Takafumi Maruyama, Tokyo, Japan

[73] Assignee: Mitsubishi Denki Kabushiki Kaisha, Tokyo, Japan

[21] Appl. No.: 09/267,598

[22] Filed: Mar. 15, 1999

[30] Foreign Application Priority Data

Oct. 9, 1998 [JP] Japan .................................. 10-287574

[51] Int. Cl.$^7$ ........................................................ H02P 7/66
[52] U.S. Cl. ........................... 318/140; 318/141; 318/146; 318/151; 322/16; 322/19; 322/28
[58] Field of Search .................................. 318/140, 141, 318/801, 146, 151, 153, 156, 477; 322/16, 19, 28

[56] References Cited

U.S. PATENT DOCUMENTS

| | | | |
|---|---|---|---|
| 3,688,171 | 8/1972 | Salihi et al. ............................. | 318/211 |
| 3,753,064 | 8/1973 | Agarwal et al. ........................ | 318/227 |
| 4,315,203 | 2/1982 | Ibamoto et al. ........................ | 318/807 |
| 5,317,937 | 6/1994 | Yoshizawa et al. .................... | 477/120 |
| 5,345,154 | 9/1994 | King ....................................... | 318/49 |
| 5,541,488 | 7/1996 | Bansai et al. .......................... | 318/801 |
| 5,789,881 | 8/1998 | Egami et al. ........................... | 318/139 |

FOREIGN PATENT DOCUMENTS 63-52605 3/1988 Japan .
6-98412 4/1994 Japan .

*Primary Examiner*—Stanley J. Witkowski
*Assistant Examiner*—Rita Leykin
*Attorney, Agent, or Firm*—Sughrue, Mion, Zinn, Macpeak & Seas, PLLC

[57] ABSTRACT

To obtain a control apparatus for a Diesel-electric locomotive that harmonizes an engine power with a torque command of an induction motor, which is a load of an engine, in the Diesel-electric locomotive and avoids an overload of the engine.

A cooperative controller 15 is provided, the controller 15 which receives a notch signal N, an engine speed command value n* corresponding to the notch signal N, an engine speed n, and rotating speed fr of an induction motor 17, calculates a torque command value Tp corresponding to the engine speed n from torque command values before and after the notch signal changing during response time for control of the engine speed if the notch signal N changes, and calculates the torque command value Tp corresponding to the notch signal N after a notch is changed, except the case thereof. Furthermore, the torque command value Tp is outputted to an inverter controller 20.

5 Claims, 7 Drawing Sheets

CONTROL APPARATUS FOR INTERNAL COMBUSTION TYPE ELECTRIC LOCOMOTIVE

BACKGROUND OF THE INVENTION

1. Field of the Invention

The present invention relates to a control apparatus for an internal combustion type electric locomotive that is suitable to a Diesel-electric locomotive using an induction motor, which is driven by a variable-voltage and variable-frequency inverter, as a motor for promoting rolling stocks.

2. Description of Related Art

A Diesel-electric locomotive is driven by transforming Diesel engine power into three-phase AC power, converting the three-phase AC power into DC power with a three-phase diode rectifier, further converting the DC power again into AC power with a variable-voltage and variable-frequency inverter, and supplying the AC power to an induction motor for promoting rolling stocks.

A Diesel engine power is determined by an engine speed determined by a notch command in a master controller, and an optimum power exists every notch. Therefore, it is necessary to control an output power of the induction motor for promotion, which is a load of the engine, according to the optimum engine power so that the output power of the induction motor for promotion may always become the engine power or less. If the load to the engine power becomes an overload, the engine may go into a stall in the worst case.

Then, methods for performing cooperative control between engine power and a load thereof have been studied up to now. As an example of this cooperative control method, there is the method disclosed in Japanese Patent Laid-Open No. 6-98412. FIG. 9 shows a block diagram of a conventional control apparatus for a Diesel-electric locomotive that performs the cooperative control.

In the figure, a master controller 1 outputs a notch signal N. A function generator 2 generates a function output Pn corresponding to predetermined engine power with an engine speed signal n as a variable. On the other hand, a function generator 3 generates a function output PN corresponding to the predetermined engine power with a notch signal N of the master controller 1 as a variable.

A low-order-preferential selector 4 inputs the function output Pn from the function generator 2 and the function output PN from the function generator 3, and selects and outputs a smaller function output. A comparator 5 corrects the output of the low-order-preferential selector 4 with a load adjustment signal outputted from an engine governor.

A constant-power pattern generator 6 generates a current pattern Ip with a rotor frequency fr of a motor for promotion as a variable and with a signal Pp, which is supplied from the comparator 5 corresponding to the engine speed signal n or the notch signal N of the master controller 1, as a parameter. This current pattern Ip becomes a current pattern of an inverter controller controlling driving of the motor for promotion.

Since the conventional apparatus has such a construction, the function output PN immediately becomes a value after the notch signal changing, when the notch signal N of the master controller 1 is increased (notch-up), that is, the engine speed and engine power are increased. Nevertheless, since there exists response time for engine control until the engine speed becomes a speed after the notch signal changing, the function output Pn determined by the engine speed becomes smaller than the function output PN determined by the notch signal. Therefore, the function output Pn is selected as an output of the low-order-preferential selector 4, and hence an overload to the engine is avoided.

On the contrary, when the notch signal of the master controller 1 is decreased (notch-down), that is, the engine speed and engine power are decreased, the function output PN immediately becomes a value after the notch signal changing. Nevertheless, since there is the response time for engine control until the engine speed becomes a speed after the notch signal changing, the function output Pn determined by the engine speed becomes larger than the function output PN determined by the notch signal. Therefore, the function output PN is selected as the output of the low-order-preferential selector 4. In addition, at the time of notch-down, neither the function output Pn nor the function output PN generates the state of the overload to the engine. Therefore, although any one can be selected, this example selects the function output PN.

As described above, a control apparatus for a Diesel-electric locomotive in conventional art realizes the cooperative control with engine power. Nevertheless, there is a problem that, since a change of power for auxiliary equipment such as a battery charger, an air compressor, and a cooling blower is not considered, the controller in the conventional art is not always in the optimum operation state for an engine.

BRIEF SUMMARY OF THE INVENTION

Object of the Invention

The present invention is performed so as to solve problems described above and is to obtain a control apparatus for an internal combustion type electric locomotive that not only can avoid an overload of an engine by taking power for auxiliary equipment into account but also can keep the engine in an optimum operation state.

Summary of the Invention

A control apparatus for an internal combustion type electric locomotive according to a first form of the present invention is a control apparatus for an electric locomotive that converts power, generated by an AC generator driven by an engine, into DC power with a rectifier, further converts the DC power into AC power with a power converter, and controls driving of an induction motor for promoting rolling stocks, and comprises: a master controller outputting a notch signal determining the engine speed; an engine speed command generator generating an engine speed command value corresponding to the notch signal; output power command value calculation means for receiving the notch signal outputted from the master controller, the engine speed command value, the engine speed, and the speed of the induction motor, calculating an output power command value of the induction motor according to the engine speed from torque command values before and after the notch signal changing during the response time for control of the engine speed if the notch signal changes, and calculating the output power command value corresponding to the notch signal after the notch signal changing except the former case; and power converter control means outputting an output power control signal according to this output power command value to the power converter.

A control apparatus for an internal combustion type electric locomotive according to a second form of the present invention further comprises: an engine power command generator outputting an optimum engine power according to engine speed as an engine power command; output power limitation value generation means subtracting power for auxiliary equipment, which is consumed in an auxiliary equipment circuit that is an electric load of the engine, from the engine power command, and generating an output power limitation value on the basis of the subtracted value; and output power command limitation means limiting the output power command value calculated in the output power command value calculation means with this output power limitation value generated and outputting the output power command value to the power converter control means.

Output power command value calculation means of a control apparatus for an internal combustion type electric locomotive according to a third form of the present invention calculates an output power command value according to the engine speed from torque command values before and after the notch signal changing during the response time for engine speed control if the notch signal changes in the increasing direction. Furthermore, the calculation means calculates an output power command value corresponding to the notch signal after the notch being changed, except the case thereof.

Output power limitation value generation means of a control apparatus for an internal combustion type electric locomotive according to a fourth form of the present invention comprises: a subtractor subtracting power for auxiliary equipment, which is consumed in an auxiliary equipment circuit that is an electric load of the engine, from the engine power command; and a divider that generates a torque limitation value as an output power limitation value by dividing the subtracted value by angular velocity of the induction motor and outputs the torque limitation value to the output power command limitation means.

Output power limitation value generation means of a control apparatus for an internal combustion type electric locomotive according to a fifth form of the present invention comprises torque-current transform means transforming a torque limitation value into a current limitation value, and outputs this current limitation value to the output power command limitation means as an output power limitation value.

DETAILED DESCRIPTION OF THE PREFERRED EMBODIMENTS

Embodiment 1

Figure 1:
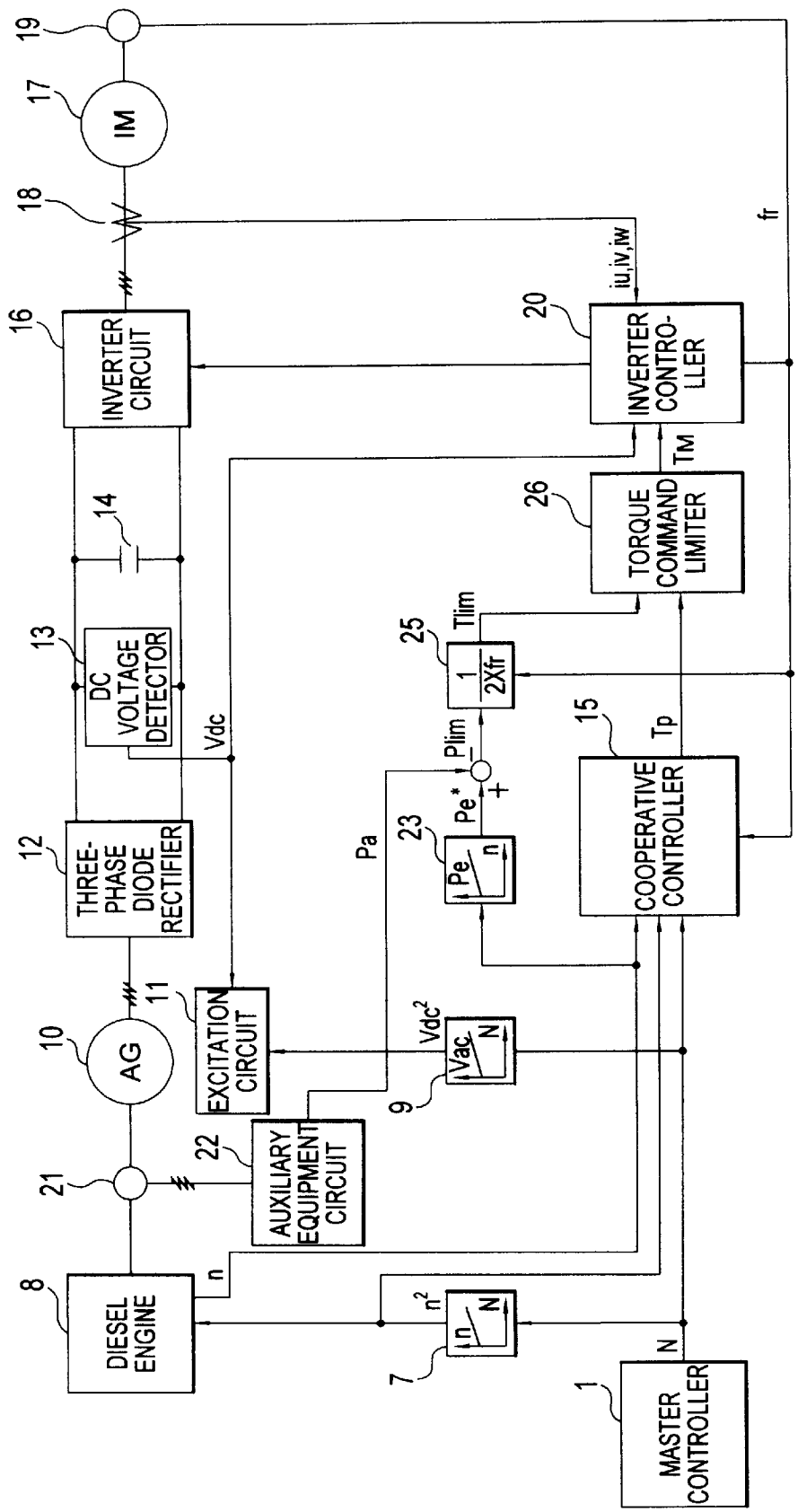
FIG. 1 is a block diagram showing a control apparatus for a Diesel-electric locomotive based on a first embodiment of this invention.

A first embodiment of the present invention will be described below with drawings. FIG. 1 is a block diagram showing a control apparatus for an internal combustion type electric locomotive according to a first embodiment of the present invention. In FIG. 1, an engine speed command generator 7 outputs a speed command value n* of, for example, a Diesel engine 8, which is a kind of an internal combustion engine, according to a notch signal N outputted from a master controller 1. The Diesel engine 8 is adjusted so that an engine speed n may become a speed command value n*, by receiving the engine speed command value n*.

A DC voltage command generator 9 outputs a DC voltage command value Vdc* according to the notch signal N outputted from the master controller 1. An AC generator 10 has a rotation axis that is connected to the Diesel engine 8. In an excitation circuit 11 of the AC generator 10, exciting current is controlled so that an AC output may become a value according to a DC voltage command value Vdc*, by receiving the DC voltage command value Vdc*, which is outputted from the DC voltage command generator 9, and a DC voltage detection value Vdc.

A three-phase diode rectifier 12 converts an AC output of the AC generator 10 into DC power. A DC voltage detector 13 detects a DC voltage, and a capacitor 14 smoothes the DC voltage. A cooperative controller (output power command value calculation means) 15 receives the notch signal N that is an output of the master controller 1, the engine speed command value n* that is an output of the engine speed command generator 7, the engine speed n obtained from the Diesel engine 8, and a rotating speed fr of the induction motor 17. In addition, the controller 15 outputs a torque command value Tp corresponding to the engine speed n.

An inverter circuit (power converter) 16 converts the DC power smoothed by the capacitor 14 into AC power whose voltage and frequency can be changed. Driving of an induction motor 17 for promoting rolling stocks is controlled by the output of the inverter circuit 16. A current detector 18 detects an output current of the inverter circuit 16, and a rotating speed detector 19 detects the rotating speed fr of the induction motor 17. An inverter controller (power converter control means) 20 determines and outputs a gate signal for the inverter circuit 16 on the basis of the torque command value Tp, DC voltage Vdc, rotating speed fr of the induction motor 17, and inverter output current iu, iv, and iw.

An auxiliary generator 21 for auxiliary power has a rotating shaft connected to the Diesel engine 8, and an auxiliary equipment circuit 22 is composed of a battery charger, an air compressor, a cooling blower, and the like to which power is supplied from the auxiliary generator 21. An engine command generator 23 outputs an optimum engine power command value Pe* according to the engine speed n, and a subtractor 24 outputs a motor power limitation value Plim after subtracting power Pa for the auxiliary equipment, which is consumed in the auxiliary equipment circuit 22, from the power Pe* of the engine power command generator 23. A divider 25 transforms the motor power limitation value Plim into a torque limitation value Tlim by dividing the motor power limitation value Plim by a value obtained by multiplying the rotating speed fr of the induction motor 17 by 2π. Furthermore, a torque command limiter (output power command limitation means) 26 receives the torque command value Tp outputted from the cooperative controller 15 and the torque limitation value Tlim outputted from the divider 25. Moreover, the torque command limiter 26 outputs a torque command value TM that is outputted to the inverter controller 20 as Tm=Tp if Tp≦Tlim and is outputted as Tm=Tlim if Tp>Tlim. In addition, output limitation value generation means is composed of the subtractor 24 and divider 25.

Next, operation of this embodiment will be described with the processing of the cooperative controller 15 as the center.

Figure 2:
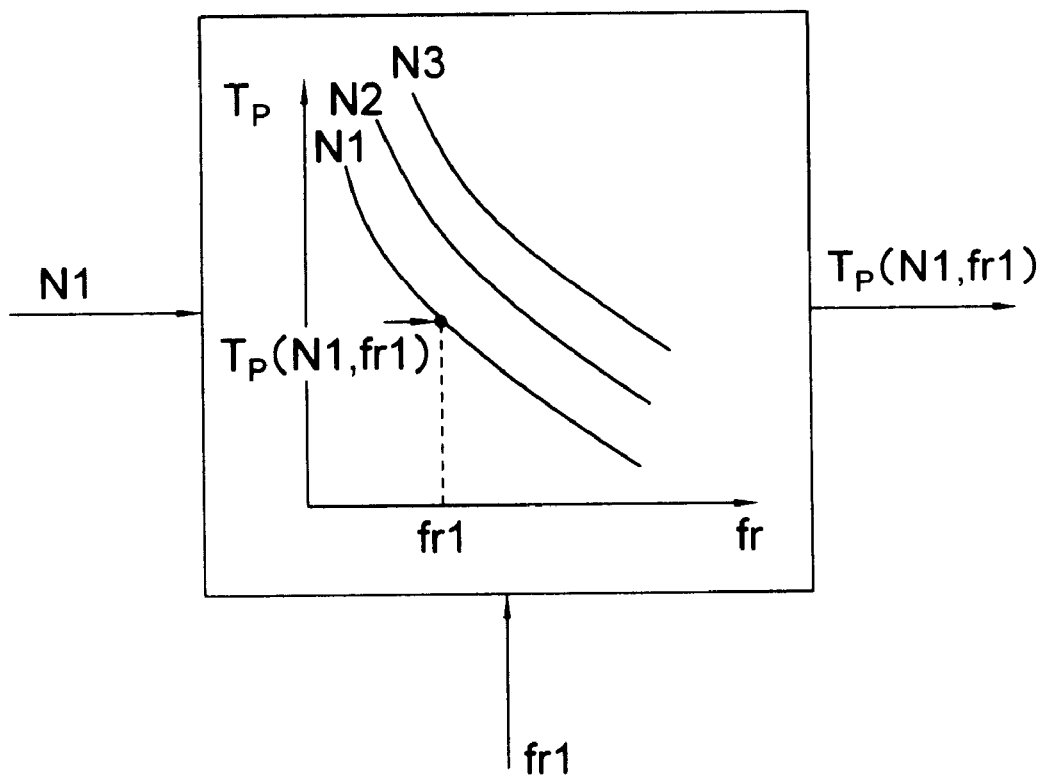
FIG. 2 is a graph for explaining a torque command value (N, fr) that is had every notch signal N as a function of rotating speed fr of an induction motor.

The cooperative controller 15, similarly to the constant power pattern generator 6 in the conventional example, has a function of the torque command value Tp as a variable of the rotating speed fr of the induction motor 17 every notch signal N in, for example, a table stored in memory not shown. This relation is shown in FIG. 2. For example, if the notch signal is N1 and the rotating speed of the induction motor 17 is fr1, the torque command value becomes Tp(N1, fr1).

If the notch signal N outputted from the master controller 1 is N1, the engine speed command generator 7 outputs the engine speed command value n1* corresponding to the notch signal N1. Therefore, the engine 8 is adjusted so that the engine speed n may become the command value n1*. In addition, the DC voltage command value generator 9 outputs the DC voltage command value Vdc1* corresponding to the notch signal N1. Hence, the exciting current of the AC generator 10 is adjusted in the excitation circuit 11 so that the DC voltage Vdc may become the DC voltage command value Vdc1*.

The output of the AC generator 10 is converted into DC power by the three-phase diode rectifier 12, and the DC voltage is smoothed by the capacitor 14 and is detected by the DC voltage detector 13. The cooperative controller 15 receives the notch signal N1, engine speed command value n1*, engine speed n, and rotating speed fr of the induction motor 17, and outputs Tp(N1, fr) as the torque command value Tp. The torque command value Tp is inputted to the torque command limiter 26. Furthermore, the torque command limiter 26 outputs the DC voltage detection value Vdc, inverter output current iu, iv, and iw, and rotating speed fr of the induction motor 17 as well as the torque command value TM to the inverter controller 20. The inverter controller 20 outputs a gate signal for the inverter circuit 16 on the basis of these input signals.

When the notch signal N outputted from the master controller 1 changes from this state to N2, the engine speed command generator 7 outputs an engine speed command value n2* corresponding to the notch signal N2. Although the Diesel engine 8 is adjusted so that the engine speed n may become the command value n2*, there exists the response time for control until the engine speed n becomes the command value n2*. During this response time for control, the cooperative controller 15 obtains the torque command value Tp corresponding to the engine speed n with using the following Equation (1) and outputs the torque command value Tp.

$$Tp = R \times (Tp(N2, fr) - Tp(N1, fr)) + Tp(N1, fr) \quad (1)$$

Here, R is a variable representing the position where the engine speed n exists between the engine speed command values n1* and n2*, and is calculated in the following Equation (2).

$$R = (n - n1^*)/(n2^* - n1^*) \quad (2)$$

In addition, the torque command values Tp(N1, fr) and Tp(N2, fr), as described above, can be obtained with using the relation shown in FIG. 2.

Furthermore, the response time for control of the engine speed can be obtained from R expressed in Equation (2). Thus, it can be seen from Equation (2) that R has a value between 0 and 1, and R=1 represents that the engine speed n reaches the engine speed command value n2*. Therefore, with using a set value RLM that is a little less than 1, the cooperative controller 15 outputs the torque command value Tp obtained from Equation (1) by judging that it is within the response time for control of the engine speed while R<RLM. If R≧RLM, the controller 15 outputs Tp=Tp(N2, fr) as the torque command value Tp by judging that the response time for control elapsed.

In this manner, it is possible to obtain the torque command value Tp corresponding to the engine speed n during the response time for control of the engine speed n.

Figure 3:
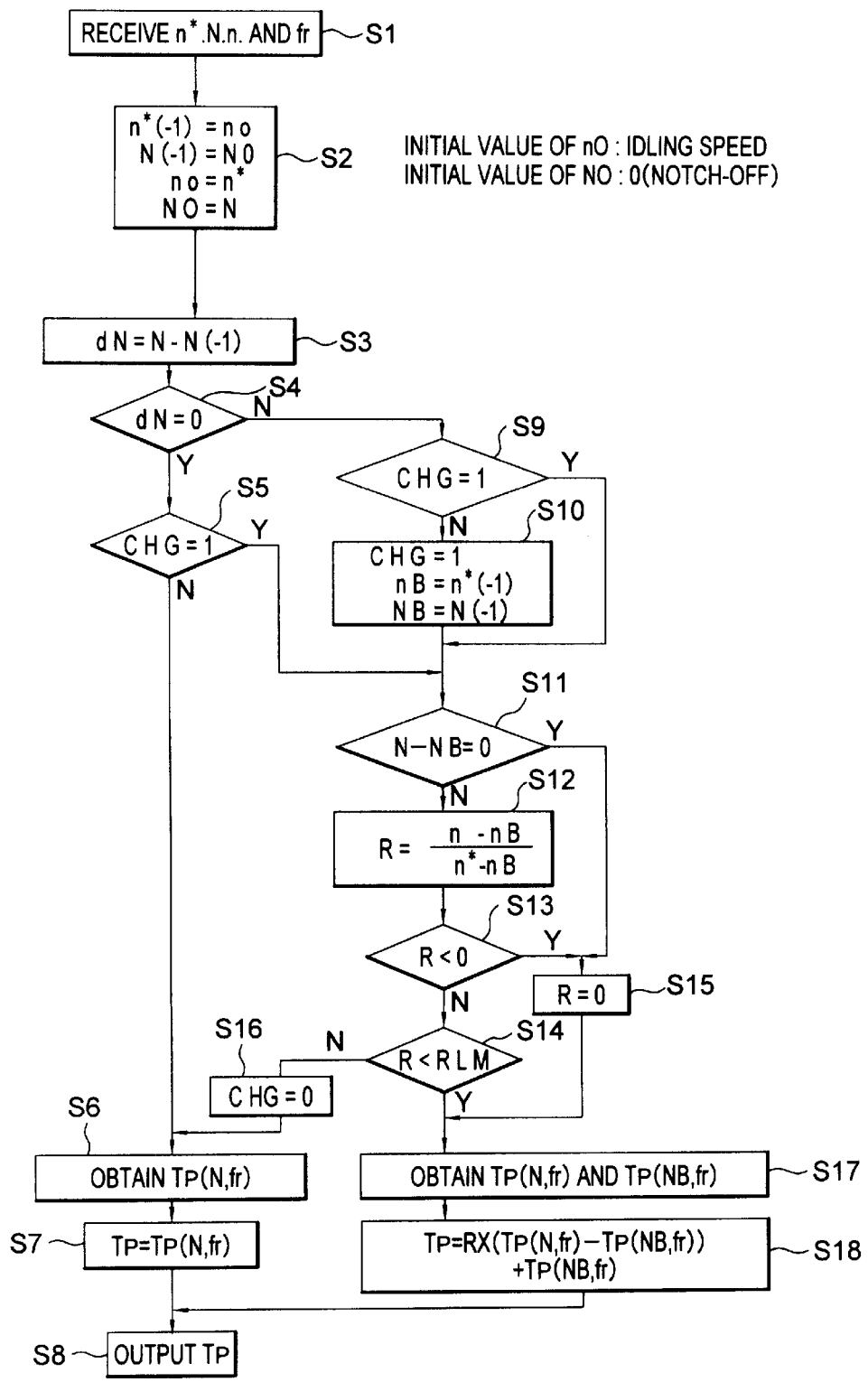
FIG. 3 is a flow chart drawn by generalizing the processing of a cooperative control block 15 based on the first embodiment.

FIG. 3 is a flow chart showing generalized processing of the cooperative controller 15. In the chart, symbols n*(-1) and N(-1) show the engine speed command value and notch signal respectively in the one preceding control period. A flag CHG shows whether it is within the response time for control after the notch command changing, it is within the response time for control if the CHG=1, and it is out of the response time for control if CHG is not one. In addition, with adapting the above description, nB corresponds to n1*, and NB corresponds to N1. The engine speed command values n* and n*(-1) can have either n1* or n2* respectively, and the notch signals N and N(-1) can have either N1 or N2 respectively.

Next, contents of processing by the cooperative controller 15 in this embodiment will be described with reference to the flow chart in FIG. 3. At step S1, the current notch signal N, engine speed command value n*, engine speed n, and rotating speed fr of the induction motor 17 are inputted. At step S2, the engine speed command value and notch signal that were stored in intermediate variables n0 and N0 in the one preceding control period are moved to the engine speed command value n*(-1) and notch signal N(-1) that are values in the one preceding control period. Furthermore, the current engine speed command value n* and notch signal N are stored in the intermediate variables n0 and N0. In addition, at the time of startup of the Diesel-electric locomotive, the intermediate variable n0 is set at an idling rotating-speed as an initial value, and intermediate variable N0 is set at 0 because of no notch signal (a notch-off signal).

At step S3, a signal dN showing a notch change is obtained by subtraction of the current notch signal N and the notch signal N(-1) in the just preceding control period. Thus, when dN=0, this shows that the notch is not changed. When dN<0, this shows the notch-down operation, and, when dN>0, notch-up operation.

At step S4, the process branches according to presence and absence of a notch change. If the notch is not changed, the process goes to step S5, and, if changed, the process goes to step S9.

The process branches at step S5 according to whether the flag CHG, showing whether it is within the response time for control after the notch signal changing, is one. Therefore, if CHG=1, the process goes to step S11, and, if the flag CHG is not one, the process goes to step S6.

At step S6, Tp(N, fr) is obtained from the current notch signal N and rotating speed fr of the induction motor 17 with using the relation shown in FIG. 2.

At step S7, the torque command value Tp is set at Tp(N, fr), and the torque command value Tp is outputted at step S8.

The process, similarly to the process at step S5, branches at step S9 according to whether the flag CHG, showing whether it is within the response time for control after the notch signal changing, is one. Therefore, if CHG=1, the process goes to step S11, and, if the flag CHG is not one, the process goes to step S10.

Step S10 is processed only in a control period just after a notch changing, step S10 where not only the flag CHG is set at 1 but also the engine speed command value n*(−1) and notch signal N(−1) in the just preceding control period are stored as values nb and Nb respectively.

Processing for preventing division by zero at step S12 is performed at step S11, that is, the process branches according to whether the result of subtraction of the current notch signal N and NB is zero. If the result is zero, the process goes to step S15, and, if not, the process goes to step S12.

At step S12, with using the current engine speed n and engine speed command values n* and nB, the value of the variable R showing the position where the engine speed n exists between the engine speed command values n* and nB is obtained by calculating the next Equation (3).

$$R=(n-nB)/(n*-nB) \quad (3)$$

At step S13, the process branches according to a region of the variable R. If R<0, the process goes to step S15, and, if R≧0, the process goes to step S14.

At step S14, the process branches after judging with using the set value RLM, which is a little less than one, whether it is within the response time for control of the engine speed. If R≧RLM, the process goes to step S16.

R is set at zero at step S15.

Since the response time for control elapsed at step S16, the flag CHG is set at zero.

At step S17, the torque command value Tp(N, fr) is obtained from the current notch signal N and rotating speed fr of the induction motor 17, and Tp(NB, fr) is obtained from NB and fr with using the relation shown in FIG. 2.

The torque command value Tp is obtained by calculating the next Equation (4) at step S18, and the torque command value Tp is outputted at step S8.

$$Tp=R \times (Tp(N, fr)-Tp(NB, fr))+Tp(NB, fr) \quad (4)$$

On the other hand, the auxiliary generator 21 supplies power Pa for auxiliary equipment in the auxiliary equipment circuit 22 without depending on the engine speed. Since the power Pa for auxiliary equipment also is a load of the Diesel engine 8, it is necessary to take also the power Pa for auxiliary equipment into account so as to avoid the overload of the Diesel engine 8. In addition, there is engine power Pe* in the Diesel engine 8, where fuel efficiency becomes optimum according to the engine speed n. Therefore, the output power of the induction motor 17 should be limited to (Pe*−Pa) so as to keep the engine power less than or equal to Pe*. In the present invention, this is realized as follows.

The engine power command generator 23 outputs the optimum engine power command value Pe*, which corresponds to the engine speed, with using the relation between the engine speed n and optimum engine power Pe*. The power Pa for auxiliary equipment is given from the auxiliary equipment circuit 22, the subtractor 24 calculates (Pe*−Pa), and an output power limitation value Plim of the induction motor 17 is obtained. The divider 25 obtains a torque limitation value Tlim by calculating Tlim=Plim/2πfr for transforming the output power limitation value Plim into the torque limitation value Tlim. Next, the torque command limitation value Tlim is inputted. If Tp≦Tlim, Tm is set at Tp, and, if Tp>Tlim, Tm is set at Tlim and the torque command value Tm is outputted to the inverter controller 20.

Since the inverter controller 20 is controlled on the basis of this torque command value Tm, it is possible to keep the state of engine operation, where combustion efficiency is optimum without becoming the overload for the engine power.

Although it is described above that the engine speed n is obtained directly from the engine 8, the engine speed can be also obtained by detecting the frequency of the AC output voltage of the AC generator and dividing the frequency by the number of pole-pairs of the AC generator as expressed in Equation (5).

Engine speed=(frequency of Ac voltage)/(number of pole-pairs) (5)

In regard to the rotating speed fr of the induction motor 17, the speed of a locomotive may be used instead of the rotating speed fr as the horizontal axis in FIG. 2.

Furthermore, although the engine 8 is a Diesel engine, the present invention can be also applied to other internal combustion engines such as a gasoline engine.

As for the AC generator 10, although a case that the control of the DC voltage is performed in the excitation circuit 11 is described, the present invention can be also applied to a case that the control of the AC output voltage of the AC generator 10 is performed, similarly.

Figure 4:
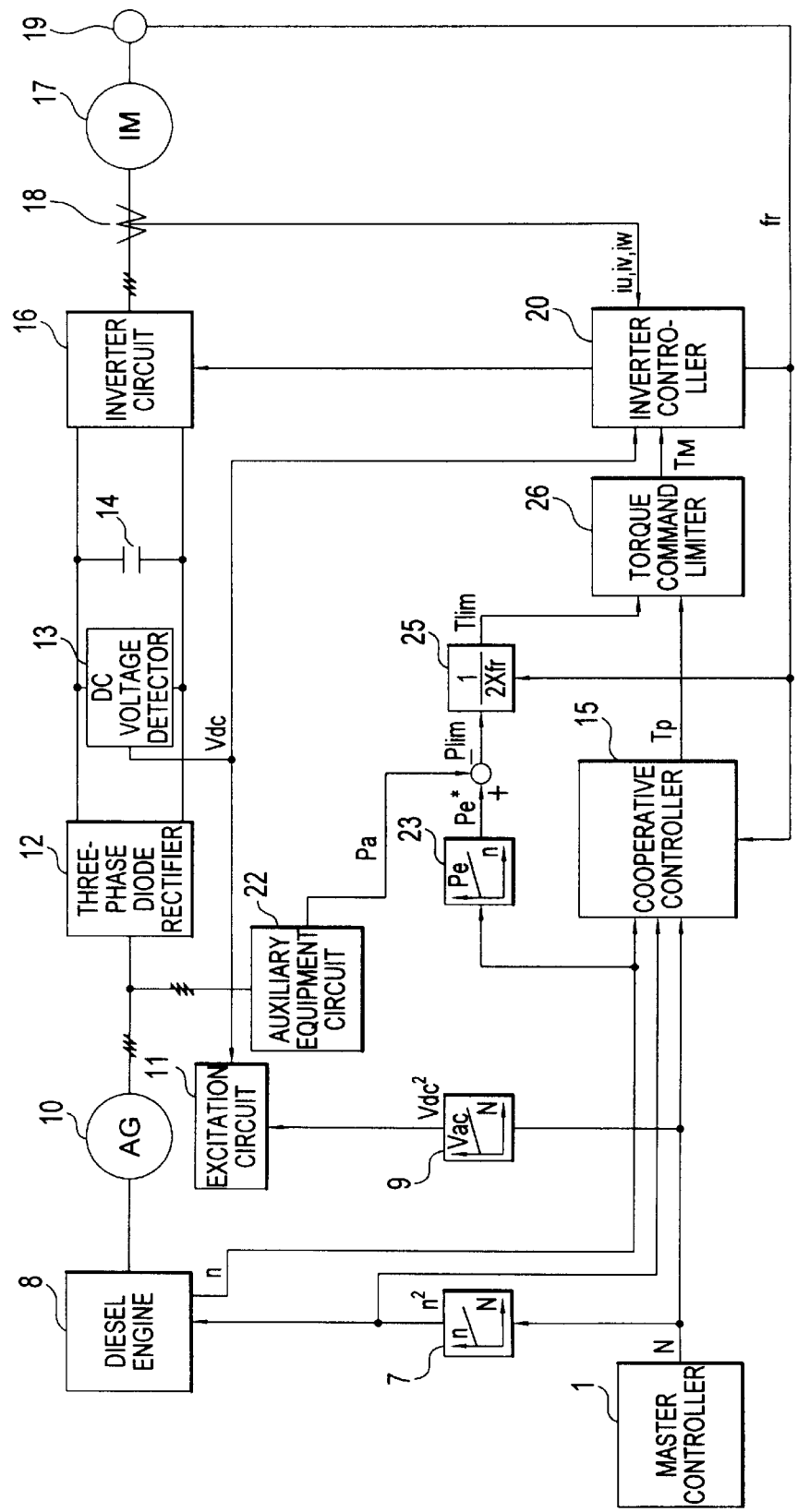
FIG. 4 is a block diagram showing a control apparatus for a Diesel-electric locomotive based on the first embodiment, the drawing showing a takeout form of auxiliary power.
Figure 5:
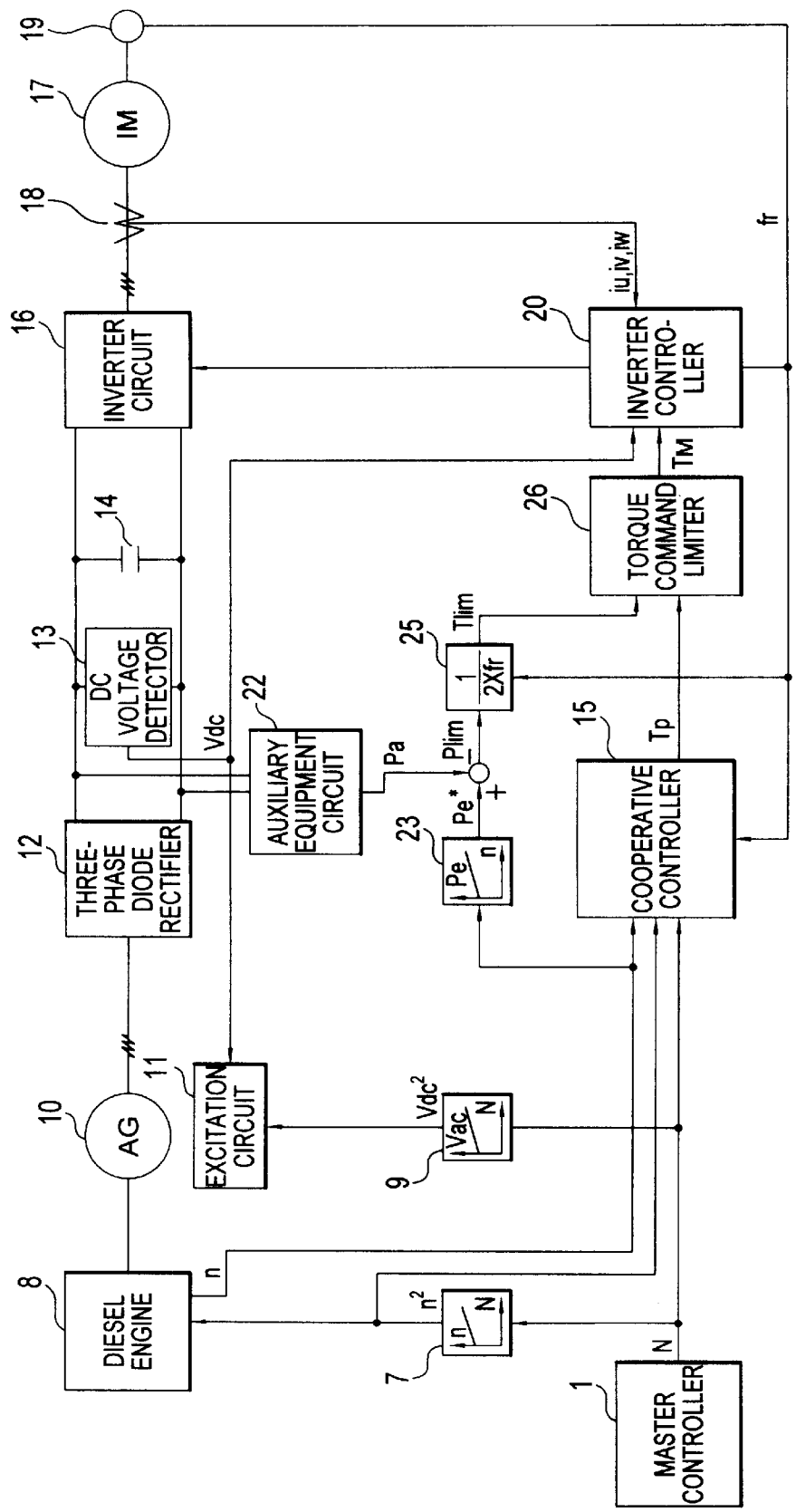
FIG. 5 is a block diagram showing a control apparatus for a Diesel-electric locomotive based on the first embodiment, the drawing showing a takeout form of auxiliary power.

Although it is shown in FIG. 1 that the power for auxiliary equipment is supplied by the auxiliary generator 21, there are also constructions shown in FIGS. 4 and 5. The present invention can be also applied to these constructions. FIG. 4 shows a construction of supplying the power for the auxiliary equipment circuit 22 from the AC output of the AC generator 10. FIG. 5 shows another construction of supplying the power for the auxiliary equipment circuit 22 from the DC output of the three-phase diode rectifier 12.

Embodiment 2

In the first embodiment, the torque command value Tp obtained in Equation (1) is outputted during the response time for control of the engine speed when the notch signal N changes. Nevertheless, if the notch signal changes in the decreasing direction, Tp(N2, fr) after the change of the notch signal becomes smaller than the torque command value Tp obtained in Equation (1). Therefore, using Tp(N2, fr) is preferable for the engine 8.

Figure 6:
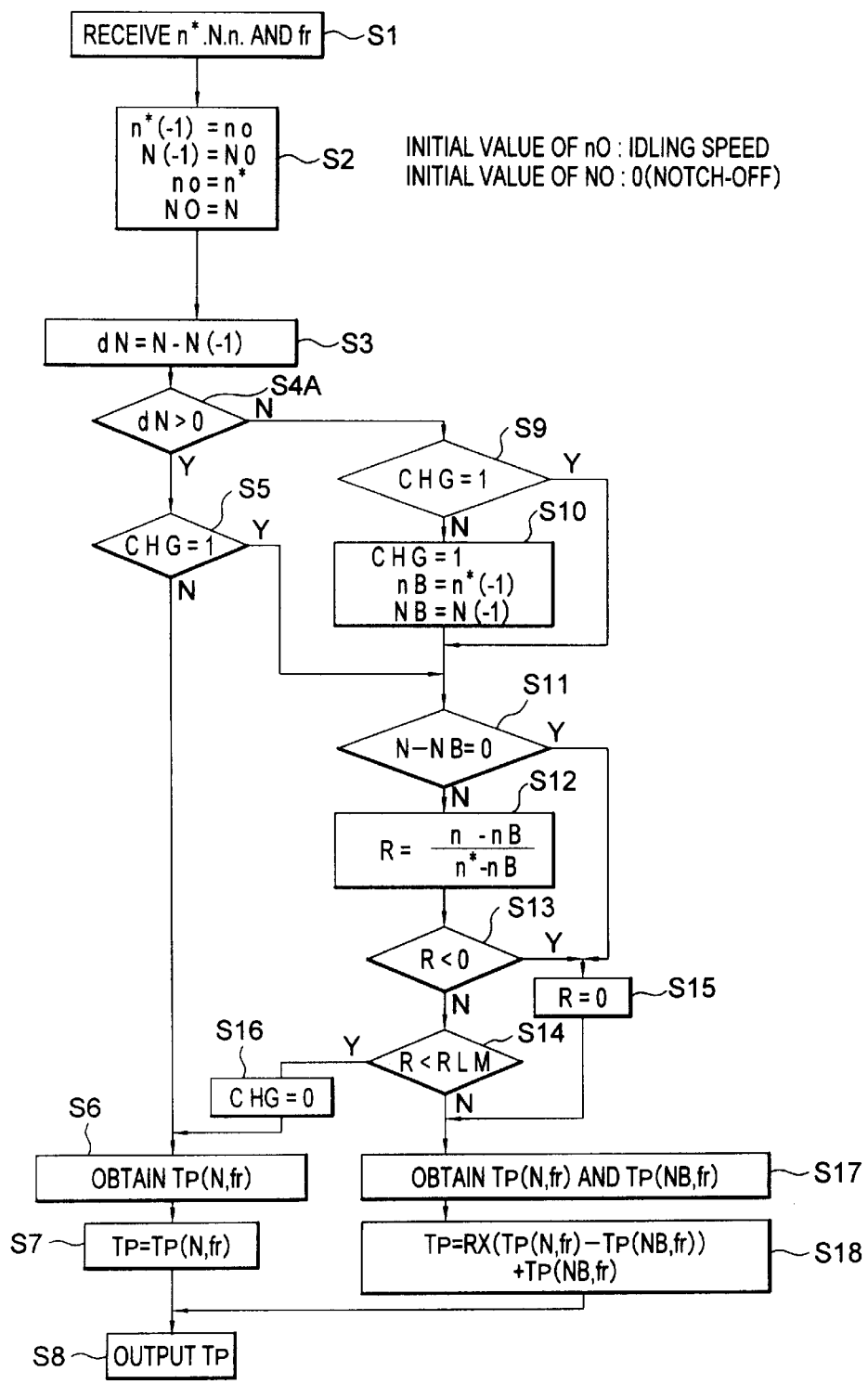
FIG. 6 is a flow chart drawn by generalizing the processing of a cooperative control block 15 based on a second embodiment.

Then, in this embodiment, the torque command value Tp obtained in Equation (1) is outputted during the response time for control of the engine speed only if the notch signal N changes in the increasing direction, and Tp(N2, fr) is outputted if not in the increasing direction. A flow chart of the cooperative controller 15 in this case is shown in FIG. 6. The cooperative controller 15 judges at step S4A in FIG. 6 whether the change of the notch signal N is positive. If the change is positive, the cooperative controller 15 obtains the torque command value from Equation (1), and, if not, the controller 15 outputs Tp(N, fr) corresponding to the present notch signal N and rotating speed fr of the induction motor 17 as the torque command value Tp.

Embodiment 3

Although, in the embodiments 1 and 2, it is described that the input to the inverter controller 20 is a torque command value, with depending on a construction of the inverter controller 20, a current command value of the induction motor 17 may be used instead of the torque command value. At this time, the cooperative controller 15 obtains and outputs the current command value Ip instead of the torque command value Tp.

Similarly to FIG. 2, the current command value Ip is given as a function of the rotating speed fr of the induction motor. If the notch signal is N1 and the rotating speed of the induction motor 17 is fr1, the current command value becomes Ip(N1, fr1). In the flow charts in FIGS. 3 and 6, the current command value Ip can be obtained in the same construction if Tp is replaced to Ip. Therefore, this embodiment can obtain the similar effects to those of the first and second embodiments.

Figure 7:
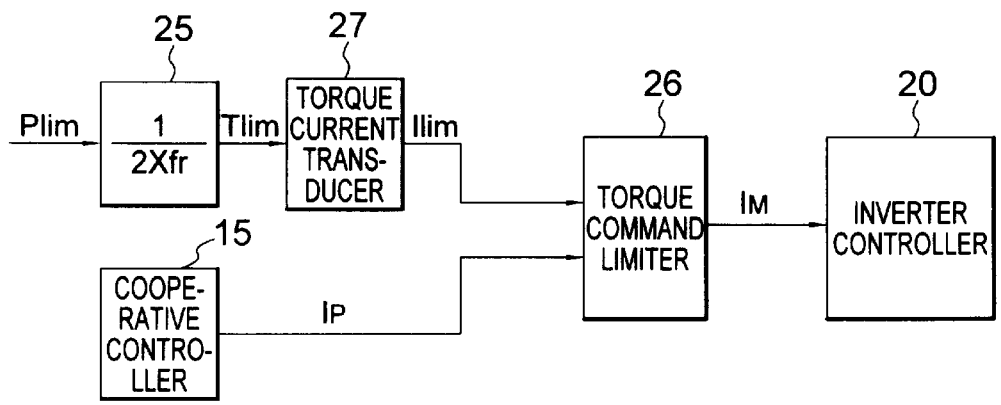
FIG. 7 is a block diagram showing a main part of a control apparatus for a Diesel-electric locomotive based on a third embodiment.

On the other hand, the torque limitation value Tlim obtained in the divider, as shown in FIG. 7, is transformed from the torque limitation value Tlim into the current limitation value on the basis of a characteristic of the induction motor 17 in the torque-current transducer 27. Then, the torque command limiter 26 receives Ip outputted from the cooperative controller 15 and the current limitation value Ilim outputted from the torque-current transducer 27. The limiter 26 outputs the current command value Im to the inverter controller 20 with setting Im at Ip in case of Ip≦Ilim and Ilim in case of Ip>Ilim.

In addition, also in this case, it is possible to obtain the effects similar to those of the first and second embodiments.

Embodiment 4

Figure 8:
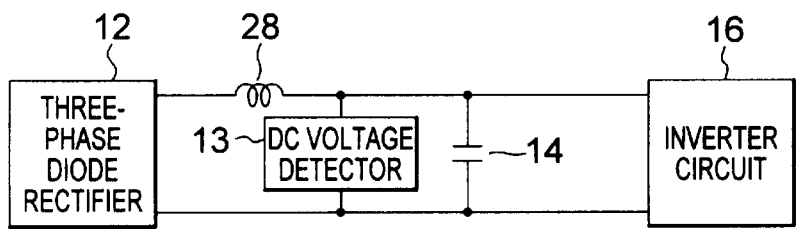
FIG. 8 is a block diagram showing a control apparatus for a Diesel-electric locomotive in the case of including a DC rector in a DC circuit block.
Figure 9:
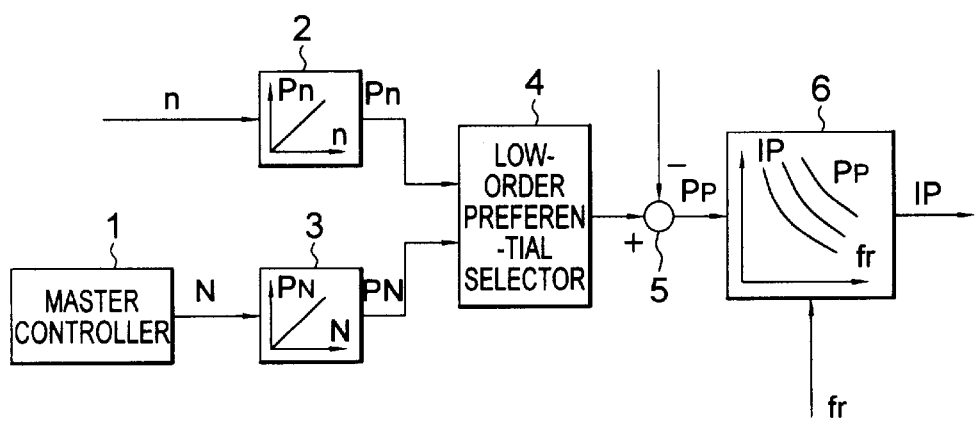
FIG. 9 is a block diagram for explaining operations of a conventional control apparatus for a Diesel-electric locomotive.

Although, in the first, second, and third embodiments, it is described that the DC circuit block is composed of the smoothing capacitor 14 and DC voltage detector 13, the present invention can be also applied to a construction of adding a DC reactor 28 in series with a plus output conductor of the three-phase diode rectifier 12 as shown in FIG. 8. Furthermore, it is possible to obtain the effects similar to those of the embodiments.

What is claimed is:

1. A control apparatus for an internal combustion type electric locomotive that converts power, generated by an AC generator driven by an engine, into DC power with a rectifier, further converts the DC power into AC power with a power converter, and controls driving of an induction motor for promoting rolling stocks, comprising:

a master controller outputting a notch signal determining engine speed; an engine speed command generator generating an engine speed command value corresponding to the notch signal;

output power command value calculation means for receiving the notch signal outputted from the master controller, the engine speed command value, the engine speed, and the speed of the induction motor, calculating an output power command value of the induction motor according to the engine speed from torque command values before and after the notch signal changing during response time for control of the engine if the notch signal changes, and calculating the output power command value corresponding to the notch signal after the notch signal changing except the case thereof; and power converter control means outputting a power control signal according to this output power command value to the power converter.

2. A control apparatus for an internal combustion type electric locomotive according to claim 1 further comprising:

an engine power command generator outputting an optimum engine power according to engine speed as an engine power command;

output power limitation value generation means subtracting power for auxiliary equipment, which is consumed in an auxiliary equipment circuit that is an electric load of the engine, from the engine power command, and generating an output power limitation value on the basis of the subtracted value; and output power command limitation means limiting the output power command value calculated in the output power command value calculation means with this output power limitation value generated and outputting the output power command value to the power converter control means.

3. A control apparatus for an internal combustion type electric locomotive according to claim 1, wherein output power command value calculation means calculates an output power command value according to the engine speed from torque command values before and after the notch signal changing during the response time for control of the engine speed if the notch signal changes in the increasing direction, and calculates an output power command value corresponding to the notch signal after the notch being changed, except the case thereof.

4. A control apparatus for an internal combustion type electric locomotive according to claim 2, wherein output power limitation value generation means comprises: a subtractor subtracting power for auxiliary equipment, which is consumed in an auxiliary equipment circuit that is an electric load of the engine, from the engine power command; and a divider that generates a torque limitation value as an output power limitation value by dividing the subtracted value by angular velocity of the induction motor and outputs the torque limitation value to the output power command limitation means.

5. A control apparatus for an internal combustion type electric locomotive according to claim 4, wherein output power limitation value generation means comprises torque-current transform means transforming a torque limitation value into a current limitation value, and outputs this current limitation value to the output power command limitation means as an output power limitation value.

* * * * *